Jan. 10, 1967   D. LEVIN   3,297,017
FOLDING BARBECUE STOVE
Filed Oct. 25, 1965   2 Sheets-Sheet 1

INVENTOR
DAVID LEVIN
By Shoemaker and Mattare
ATTYS.

Jan. 10, 1967  D. LEVIN  3,297,017

FOLDING BARBECUE STOVE

Filed Oct. 25, 1965  2 Sheets-Sheet 2

INVENTOR
DAVID LEVIN
By Shoemaker and Mattus
ATTYS.

United States Patent Office 3,297,017
Patented Jan. 10, 1967

3,297,017
FOLDING BARBECUE STOVE
David Levin, 608 Lucerne Mansions, De Villiers St., Johannesburg, Transvaal, Republic of South Africa
Filed Oct. 25, 1965, Ser. No. 505,161
Claims priority, application Republic of South Africa, Feb. 11, 1965, 65/0732
8 Claims. (Cl. 126—25)

This invention relates to a stove which is readily foldable to a convenient size for transport and is particularly suitable for use in cooking a meal at a barbecue, or when picnicking or camping.

Portable stoves exist wherein the food may be cooked by being supported over the fire and the fuel used therein often augmented by the fats from the food dropping during the cooking onto the fuel bed. Such stoves have the merit of being economical but often result in the generation of smoke, objectionable fumes, charred viands due to flareups and disagreeable flavours impregnating or coating the food owing to the smoke. The flavour of much food may be spoiled by being subjected to fumes from a fire supplied with such a mixed fuel.

It is appreciated that stoves used when camping should be easily transportable, in other words readily foldable to make a strong assembly when packed.

It is the object of this invention to make a stove to meet these requirements.

According to this invention there is provided a collapsible barbecue stove comprising a hollow rectangular base forming a water retaining compartment, a pair of oppositely disposed side walls hinged along their lower edges to the stop edges of a pair of walls of the base supporting formations projecting inwardly from said side walls, an adjustable fire basket releasably suspended from one oppositely disposed set of supporting formations and means for releasably retaining the side walls in an upright position and for suspending viands adjacent at least one open side of the fire basket.

Further features of this invention provide for the fire basket to be made with a flat sheet metal base with a pair of upwardly directed perforated metal sides, hinged to said base, said basket extending in the operative position transversely between the side walls of the stove; for the means for suspending the viands to be at least one rigid bridging member releasably engaging the tops of the side walls at variable positions and supporting skewers or a grid iron and for the grid iron to be rotatable about a central pivot secured to a carrying handle.

The invention also provides a shallow tray with foldable carrying handles and shaped to slidably engage the top edges of the side walls, a vertical removable end wall shaped to slidably engage in supporting formations at the ends of the side walls, for the walls to have inwardly facing panels spaced apart a small distance from the walls and for these panels to have reflecting surfaces.

The invention is illustrated in the accompanying drawings in which.

Figure 1:
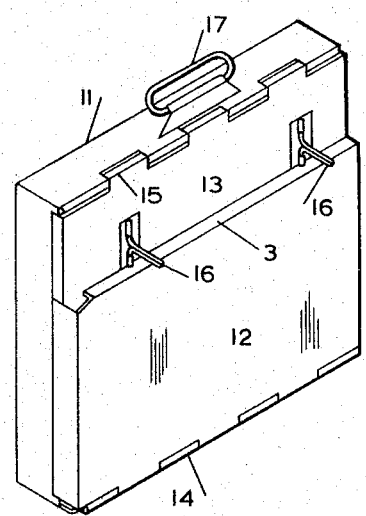
FIG. 1 is a perspective veiw of the stove packed for transport.

In the drawings 11 shows the rectangular base and to the free edges of one opositely disposed pair of walls the covers 12 and 13 are hinged at 14 and 15 respectively. When the stove is in its folded position as shown in FIG. 1 suitable catches such as 16 are used to hold the covers 12, 13 together. The handle 17 is fastened to the side 11 to which cover 13 is hinged and is convenient to enable the stove to be easily carried.

Figure 2:
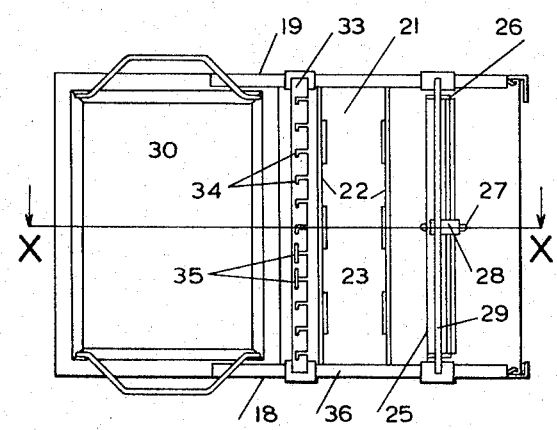
FIG. 2 is a plan of the stove.

In FIG. 2 the covers 12 and 13 have become side walls 18 and 19 respectively. These walls on the inside have panels fixed to them but spaced apart a small distance therefrom. In some cases the panels might be made to form reflectors but in any case they are notched at 20 (see FIG. 3) and in these notches 20 the tops of the fire basket 21 are supported.

The fire bucket 21 is suitable for burning fuel such as charcoal and consists of two sheets of perforated metal 22 hinged at the bottom to a narrow sheet metal strip 23 and at their tops have supporting members 24 adapted to engage with the notches 20 to carry the fire bucket 21. By supporting the fire bucket 21 in about the center of the length of the stove it can be made to cook viands on both sides at the same time.

Normally the viands to be cooked are held in a suitable support. This support forms a special grid iron 25 and consists of two discs made of wire mesh the one disc having an upstanding rim 26 to retain the food in place when the two discs are clamped together. The discs are rotatably mounted on a central pin 27 which projects at right angles from and is fixed to a stepped handle 28. Suitable clamps are provided to hold the discs together with the viands in the grid iron under suitable pressure.

A bridge piece 29 with ends shaped to slidably engage the tops of walls 18 and 19 spans between these walls and the projecting step on handle 28 may be made to engage the bridge piece 29 to support the grid iron 25 in a rotatable manner closely adjacent one or the other of the exposed perforated sides 22 of the fire basket 21.

Figure 3:
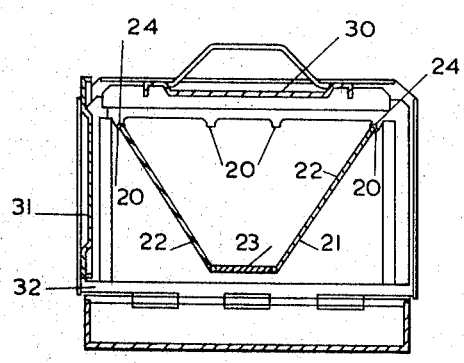
FIG. 3 is a side elevation in section on the line X—X FIG. 2, but with the fire basket and tray differently positioned.
Figure 4:
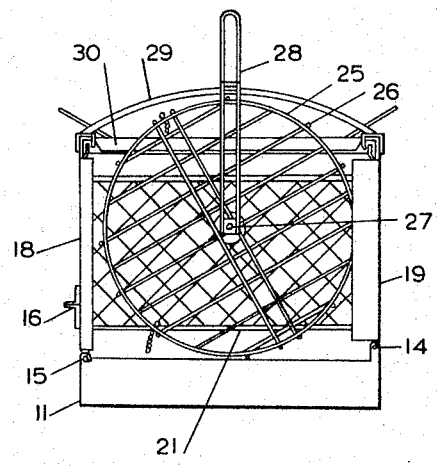
FIG. 4 is a side elevation.

When desired the handle 28 can be used to lift the grid iron 25 and turn it so that the opposite surface faces the fire bucket 21. However if desired the handle 28 can assist in supporting the grid iron 25 loaded with food over the top of fire bucket 21. In such a case the fire bucket is spread out between the others of the notches 20 as shown in FIG. 3. This is not generally a desired method of cooking on the stove. However a tray 30 which is slidably engaged to the tops of the walls 18 and 19 is provided and may be moved over the fire bucket 21 and cooking on the tray 30 may be done by frying.

It should be pointed out that the stove has a third side 31 which is slipped into place by being engaged in grooves bent in the metal at the ends of the sides 18 and 19. If side 31 is not pushed right down in place a small gap 32 under it will allow a draft of air to blow up the fire in fire bucket 21.

It will now be noticed that with the fire bucket 21 in place as in FIG. 2 a further grid iron 25 could be placed on the side of the fire between it and the side 31. In an alternative cooking scheme a bridge 33 (shown in FIG. 2) bridges the tops of walls 18, 19 and is suitably provided with slots 34 which will support downwardly depending skewers 35 on which food may be threaded for cooking in the well known manner.

As desired one or two metal rods may be supplied to act as fire pokers.

When the stove is rigged for cooking the base 11 is conveniently filled with water. The added weight makes for stability.

With the cooking completed the water in base 11 will be warm enough to be used for washing the parts of the stove as they are disassembled.

For packing up the stove for transport the fire is thrown out and the fire bucket 21 is folded flat and placed in the bottom of base 11. The tray 30 and the third side wall 31 are laid flat over the fire bucket 21. The grid iron 25 is then placed on top of wall 31.

With the various parts in place the wall 19 is folded down and finally the wall 18 is folded down to partly overlap wall 19. In this collapsed arrangement of the stove walls 18 and 19 become the closure covers 12 and 13 referred to above.

Catches 16 on cover 13 engage the flange 36 on cover 12 to hold the package containing the whole stove ready for transport as shown in FIG. 1.

It will be appreciated that when the stove is assembled for use all the members which extend transversely between the side walls 18 and 19, such as for example, the bridging pieces 29 and 33, third side wall 31 and fire basket 21 give rigidity to the stove so that it becomes a robust construction.

What I claim as new and desire to secure by Letters Patent is:

1. A collapsible barbecue stove comprising a hollow rectangular base forming a water retaining compartment, a pair of oppositely disposed side walls hinged along their lower edges to the top edges of a pair of walls of the base, supporting formations projecting inwardly from said side walls, an adjustable fire basket releasably suspended from one oppositely disposed set of supporting formations and means for releasably retaining the side walls in an upright position and for suspending viands adjacent at least one open side of the fire basket.

2. A barbecue stove as claimed in claim 1 wherein the fire basket is made up of a flat sheet metal base with a pair of upwardly directed perforated metal sides hinged to said base, said basket extending in the operative position transversely between the side walls of the stove.

3. A barbecue stove as claimed in claim 1 wherein the means for suspending the viands consists of at least one rigid bridging member releasably engaging the tops of the side walls at variable positions and supporting a downwardly depending grid iron.

4. A barbecue stove as claimed in claim 1 wherein a shallow tray having foldable lifting handles is provided and shaped to slidably engage the top edges of the side wall.

5. A barbecue stove as claimed in claim 1 wherein a vertical and removable end wall shaped to slidably engage at variable distances in supporting formations at the ends of the side walls is provided.

6. A collapsible barbecue stove comprising a hollow rectangular base forming a water retaining compartment, a pair of oppositely disposed side walls hinged along their lower edges to the top edges of a pair of walls of the base, inwardly facing panels on said side walls spaced apart a small distance therefrom, supporting formations projecting inwardly from said side walls, an adjustable fire basket releasably suspended from one oppositely disposed set of supporting formations and means for releasably retaining the side walls in an upright position and for suspending viands adjacent at least one open side of the fire basket.

7. A barbecue stove as claimed in claim 6 wherein the exposed surfaces of the panels are reflecting surfaces.

8. A collapsible barbecue stove comprising a hollow rectangular base forming a water retaining compartment, a pair of oppositely disposed side walls hinged along their lower edges to the top edges of a pair of walls of the base, supporting formations projecting inwardly from said side walls, an adjustable fire basket releasably suspended from one oppositely disposed set of supporting formations and means for releasably retaining the side walls in an upright position, and means for suspending viands adjacent at least one open side of the fire basket in the form of at least one rigid bridging member releasably engaging the tops of the side walls at variable positions and supporting a downwardly depending grid iron, said grid iron having a carrying handle with a pivot projecting therefrom and on which the grids are rotatably secured.

References Cited by the Examiner

UNITED STATES PATENTS

| | | | |
|---|---|---|---|
| 2,460,125 | 1/1949 | Carroll | 126—9 |
| 2,718,845 | 9/1955 | Dudley | 126—25 X |
| 3,237,621 | 3/1966 | Staley | 126—25 |

FREDERICK L. MATTESON, JR., *Primary Examiner.*

E. G. FAVORS, *Assistant Examiner.*